US012564780B1

(12) United States Patent
Williams

(10) Patent No.: US 12,564,780 B1
(45) Date of Patent: Mar. 3, 2026

(54) ILLUMINATED GAME BOARD WITH STACKABLE PLAY PIECES

(71) Applicant: Bryan Williams, Douglasville, GA (US)

(72) Inventor: Bryan Williams, Douglasville, GA (US)

(*) Notice: Subject to any disclaimer, the term of this patent is extended or adjusted under 35 U.S.C. 154(b) by 926 days.

(21) Appl. No.: 17/845,118

(22) Filed: Jun. 21, 2022

Related U.S. Application Data

(63) Continuation-in-part of application No. 17/510,512, filed on Oct. 26, 2021, now abandoned.

(51) Int. Cl.
*A63F 3/00* (2006.01)
*A63F 9/24* (2006.01)
*F21V 23/00* (2015.01)
*F21V 23/04* (2006.01)

(52) U.S. Cl.
CPC ...... *A63F 3/00643* (2013.01); *A63F 3/00697* (2013.01); *F21V 23/009* (2013.01); *F21V 23/04* (2013.01); *A63F 2003/00646* (2013.01); *A63F 2003/00716* (2013.01); *A63F 2009/2494* (2013.01)

(58) Field of Classification Search
CPC ........ A63F 3/00643; A63F 2003/00646; A63F 2003/00716; A63F 2009/2494; A63F 2009/2483; A63F 2009/2492; A63F 2009/2497
See application file for complete search history.

(56) References Cited

U.S. PATENT DOCUMENTS

| | | | | |
|---|---|---|---|---|
| 1,666,788 | A | 4/1928 | Palumbo | |
| 3,948,527 | A | 4/1976 | Aguirregomezcorta | |
| 4,616,832 | A | 10/1986 | Groner | |
| 4,881,740 | A | 11/1989 | Odhner | |
| 5,069,458 | A * | 12/1991 | Washington | A63F 3/00643 273/287 |
| 5,269,529 | A * | 12/1993 | Clemente | A63F 3/00643 273/238 |
| D365,288 | S | 12/1995 | O'Brien | |
| 5,882,011 | A | 3/1999 | Praria | |
| 7,029,010 | B2 | 4/2006 | Hubert | |
| 8,864,546 | B1 * | 10/2014 | Capriola | A63H 33/042 446/124 |
| 9,795,867 | B1 * | 10/2017 | Hughes | A63H 30/04 |
| 10,306,958 | B1 * | 6/2019 | Oligie | F21L 4/08 |

FOREIGN PATENT DOCUMENTS

| | | |
|---|---|---|
| CA | 2449318 | 5/2005 |

* cited by examiner

*Primary Examiner* — Michael D Dennis

(57) ABSTRACT

The illuminated game board is configured for use with a board game. The illuminated game board forms the playing surface for the board game. The illuminated game board provides illumination for the play of the game. The illuminated game board provides a contained space that is used to contain one or more dice within the playing surface formed by the illuminated game board. The illuminated game board comprises a game board and a lamp circuit. The lamp circuit mounts in the game board. The game board forms the playing surface and the containment space for the board game. The lamp circuit illuminates the game board. A plurality of illuminated tokens, which may be stackable tokens, may be positioned on the game board to mark the position of a competitor.

13 Claims, 10 Drawing Sheets

ILLUMINATED GAME BOARD WITH STACKABLE PLAY PIECES

CROSS REFERENCES TO RELATED APPLICATIONS

This application is a continuation-in-part of U.S. application Ser. No. 17/510,512, filed Oct. 26, 2021, which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of an electric game board with illumination.

SUMMARY OF INVENTION

The illuminated game board is configured for use with a board game. The illuminated game board forms the playing surface for the board game. The illuminated game board provides illumination for the play of the game. The illuminated game board provides a contained space that is used to contain one or more dice within the playing surface formed by the illuminated game board. The illuminated game board comprises a game board and a lamp circuit. The lamp circuit mounts in the game board. The game board forms the playing surface and the containment space for the board game. The lamp circuit illuminates the game board. A plurality of illuminated tokens, which may be stackable tokens, and may be positioned on the game board to mark the position of a competitor.

An objection of the invention is for all game boards and play pieces to be optionally made of low-cost hard rubber or plastic. This would have LEDs inserted in between RCA male and female connectors. The play pieces will not break, get stuck or be blocked.

A further object of the invention is that all play pieces will be stackable and light up via the LEDS.

A further object of the invention is that all components are not to be limited to colors, size, shapes, logos or games like tic-tac-toe, draft, checkers, ludo, and snakes and ladders.

A further object of the invention is for the holes in the play pieces and game board to be able to use a small nail to remove any applicable blockage in the funnels and illuminate light there through.

An object of the invention is to provide a game board for playing a board game.

Another object of the invention is to provide a plurality of illuminated tokens which may be positioned on the game board by plugging into token ports.

A further object of the invention is to illuminate the plurality of tokens that are plugged into the game board.

These together with additional objects, features and advantages of the illuminated game board will be readily apparent to those of ordinary skill in the art upon reading the following detailed description of the presently preferred, but nonetheless illustrative, embodiments when taken in conjunction with the accompanying drawings.

In this respect, before explaining the current embodiments of the illuminated game board in detail, it is to be understood that the illuminated game board is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminated game board.

It is therefore important that the claims be regarded as including such equivalent construction insofar as they do not depart from the spirit and scope of the illuminated game board. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
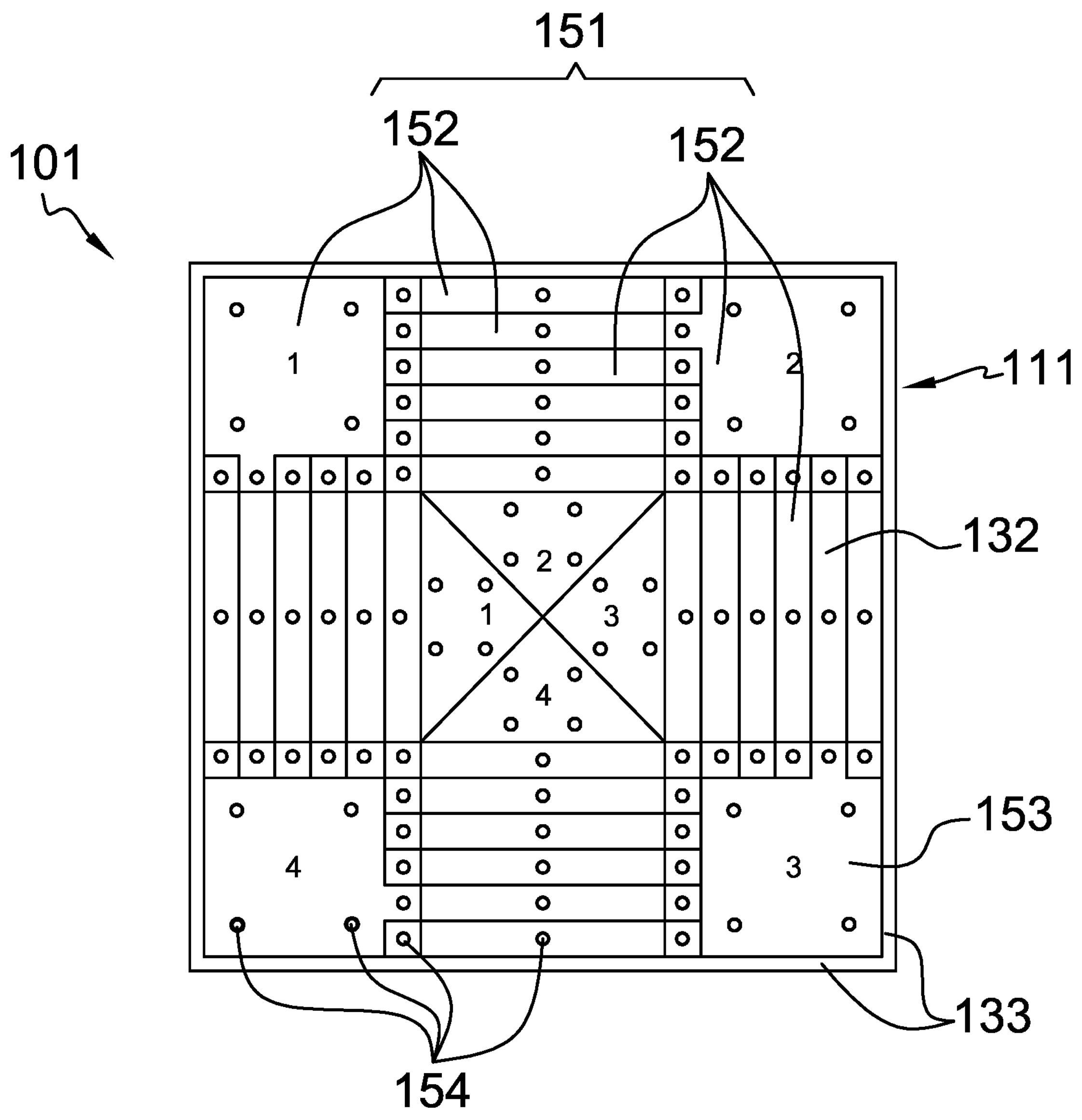
FIG. 1 is a top view of an embodiment of the disclosure.
Figure 2:
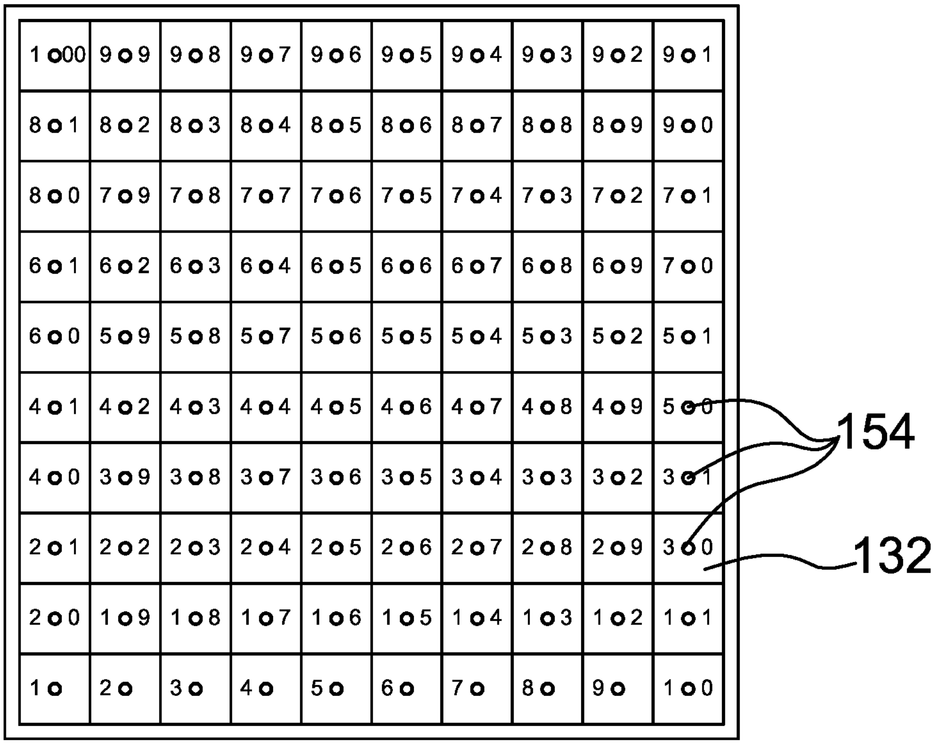
FIG. 2 is a bottom view of an embodiment of the disclosure. Illustrating an alternative game board.
Figure 3:
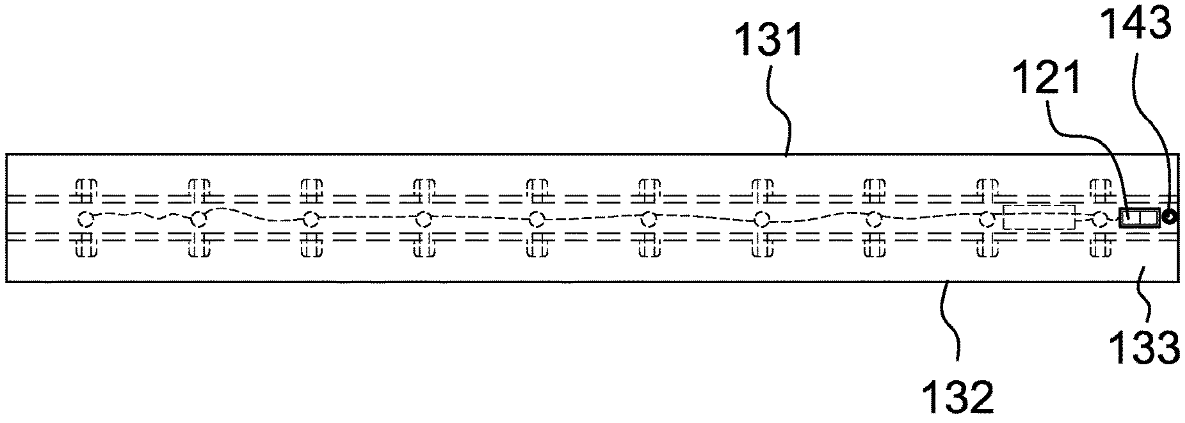
FIG. 3 is a side view of an embodiment of the disclosure.
Figure 4:
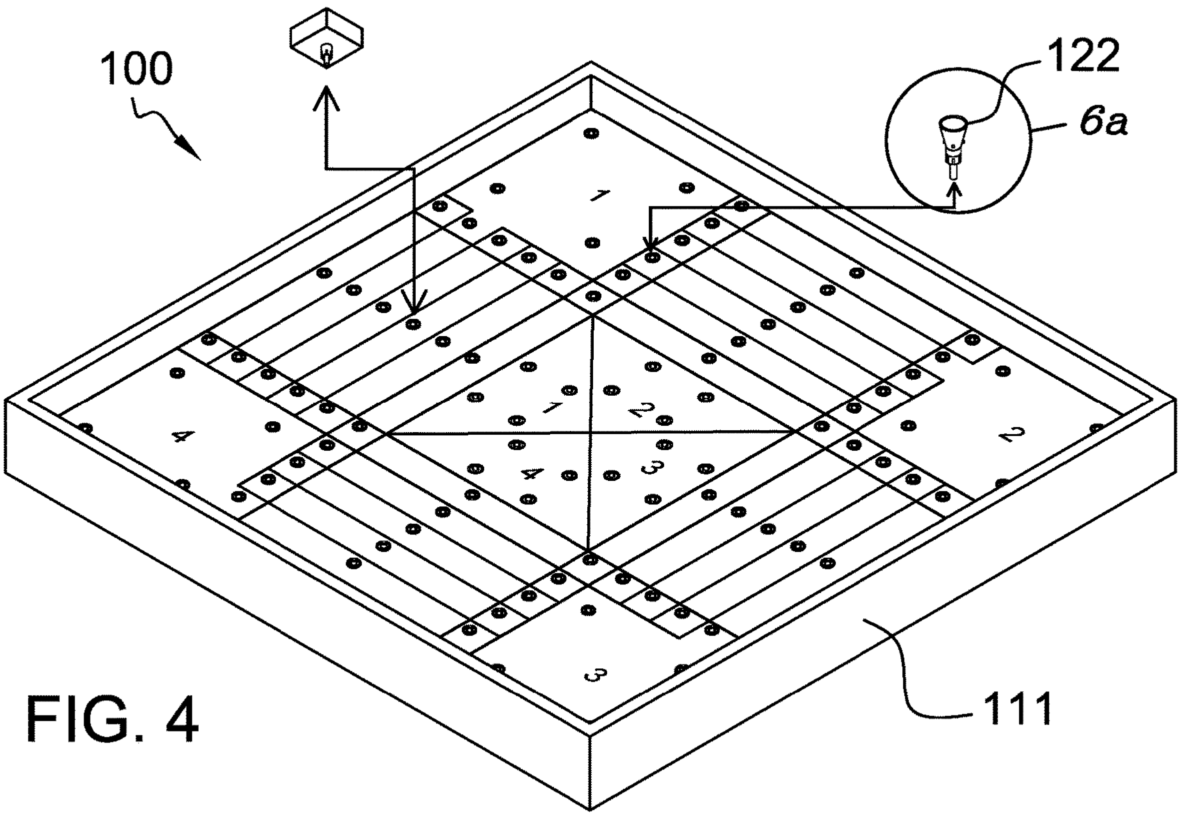
FIG. 4 is a perspective view of an embodiment of the disclosure.
Figure 5:
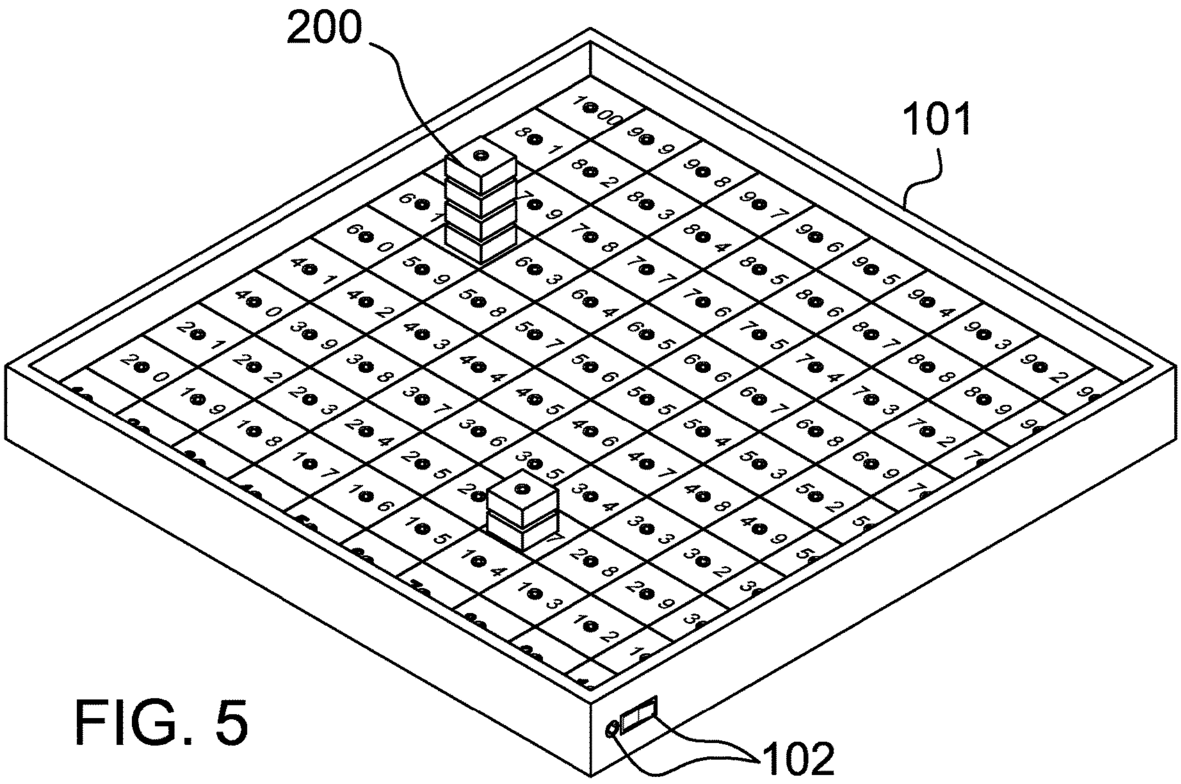
FIG. 5 is a reverse perspective view of an embodiment of the disclosure.
Figure 6A:
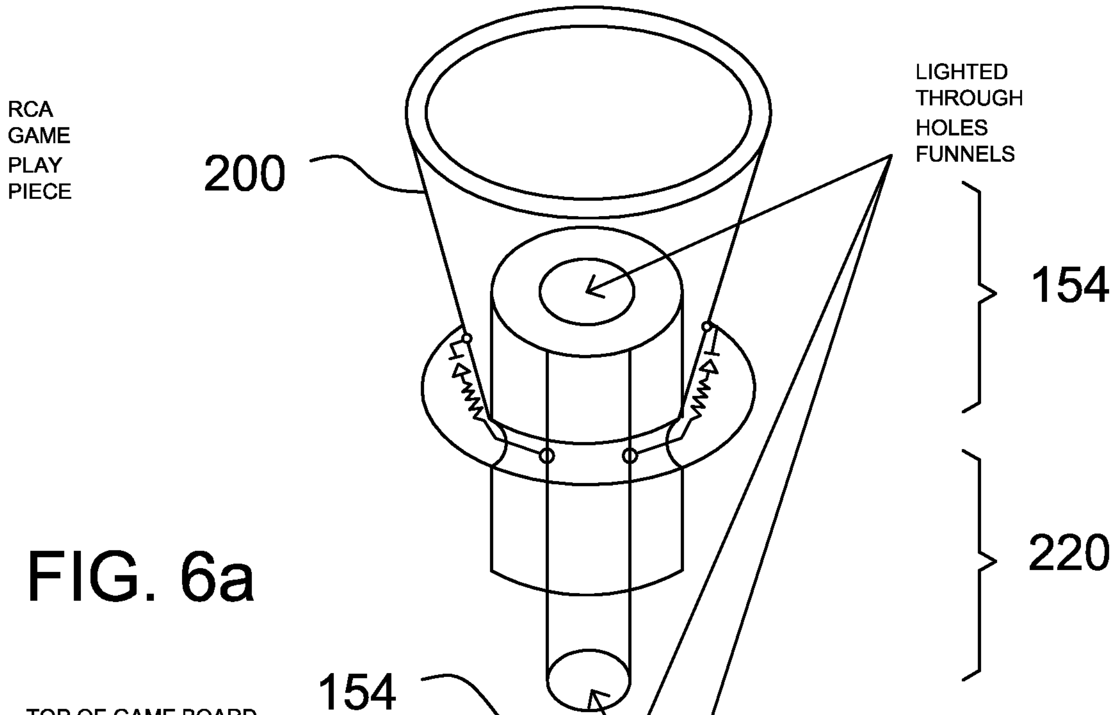
FIG. 6*a* is a detail view of an embodiment of the disclosure, illustrating a cone-shaped illuminated with both port 154 socket and token 220 plug with schematic LED circuit of place piece and funnel holes.
Figure 6B:
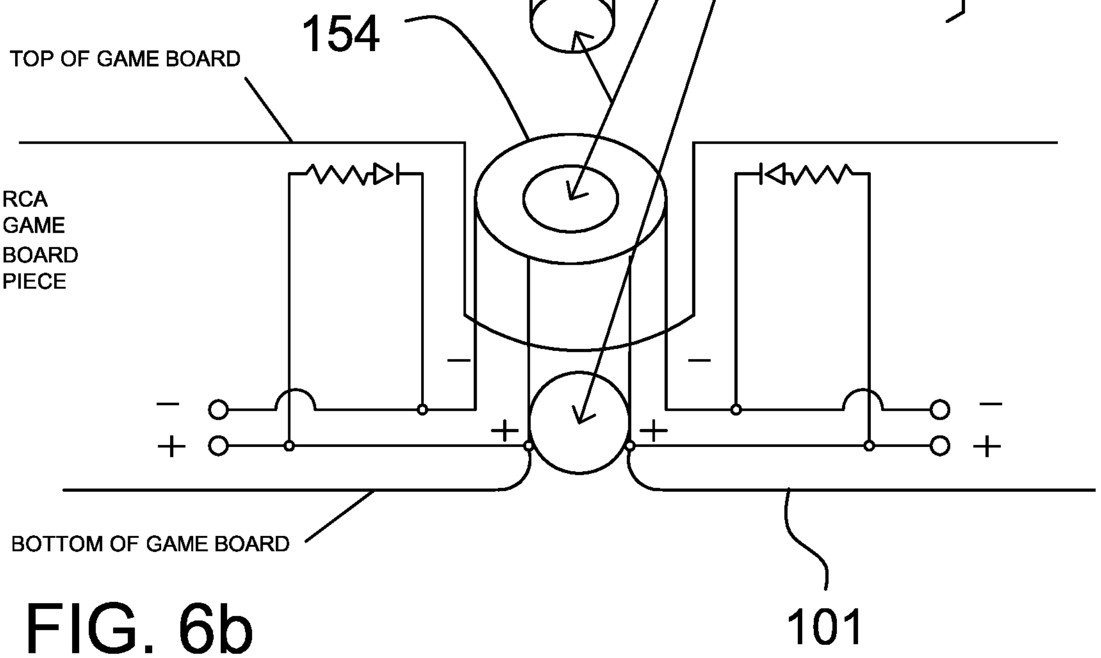
FIG. 6*b* is a detail view of an embodiment of the disclosure, illustrating a token port 154 socket on the game board with the power schematic LED circuit of the game board and funnel holes.
Figure 7:
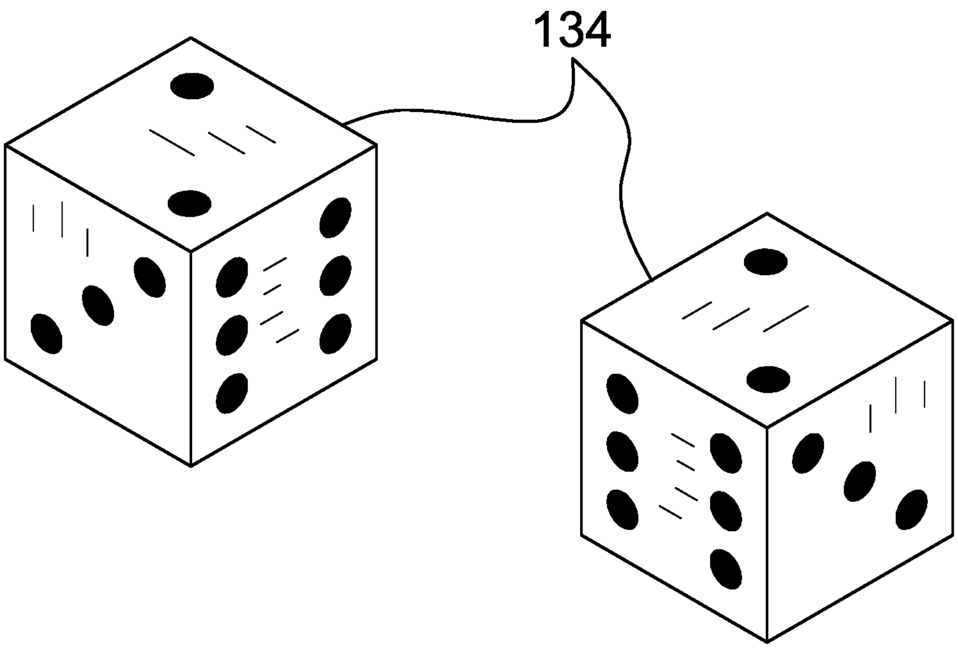
FIG. 7 is a detail view of an embodiment of the disclosure.
Figure 8:
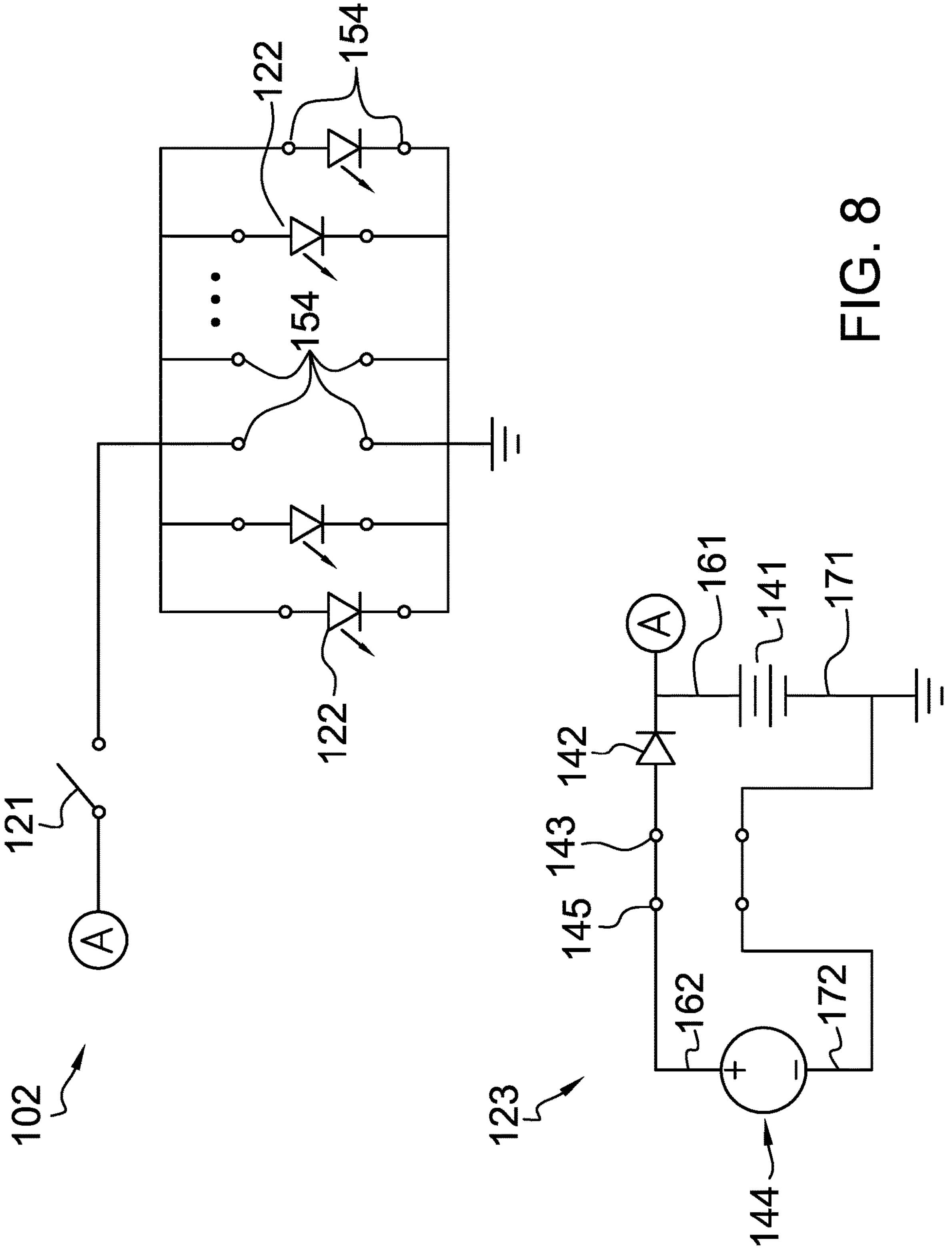
FIG. 8 is a schematic view of an embodiment of the disclosure.
Figure 9A:
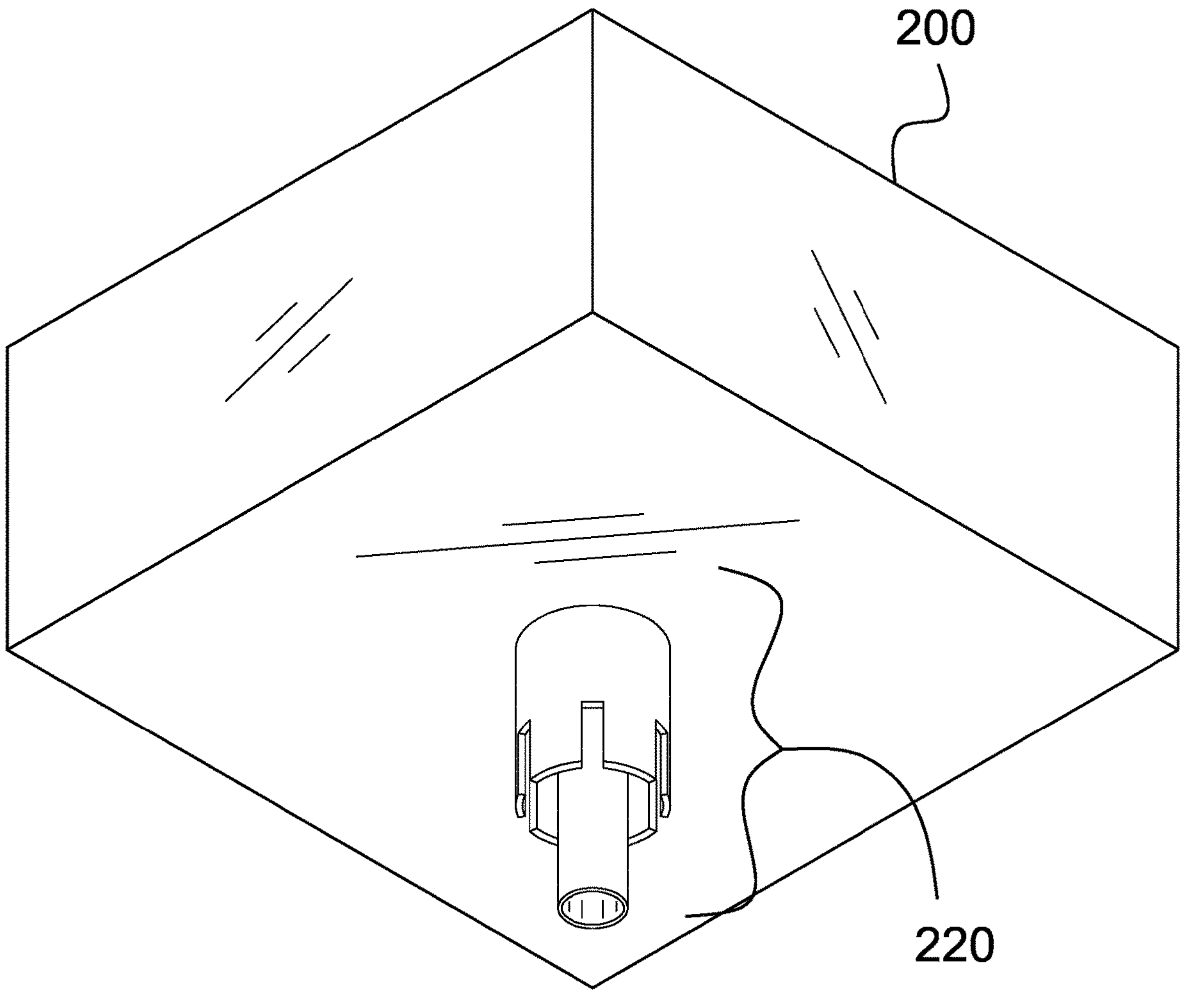
FIG. 9*a* is a detail view of an embodiment of the disclosure, illustrating the token plug on the bottom of a stackable token.
Figure 9B:
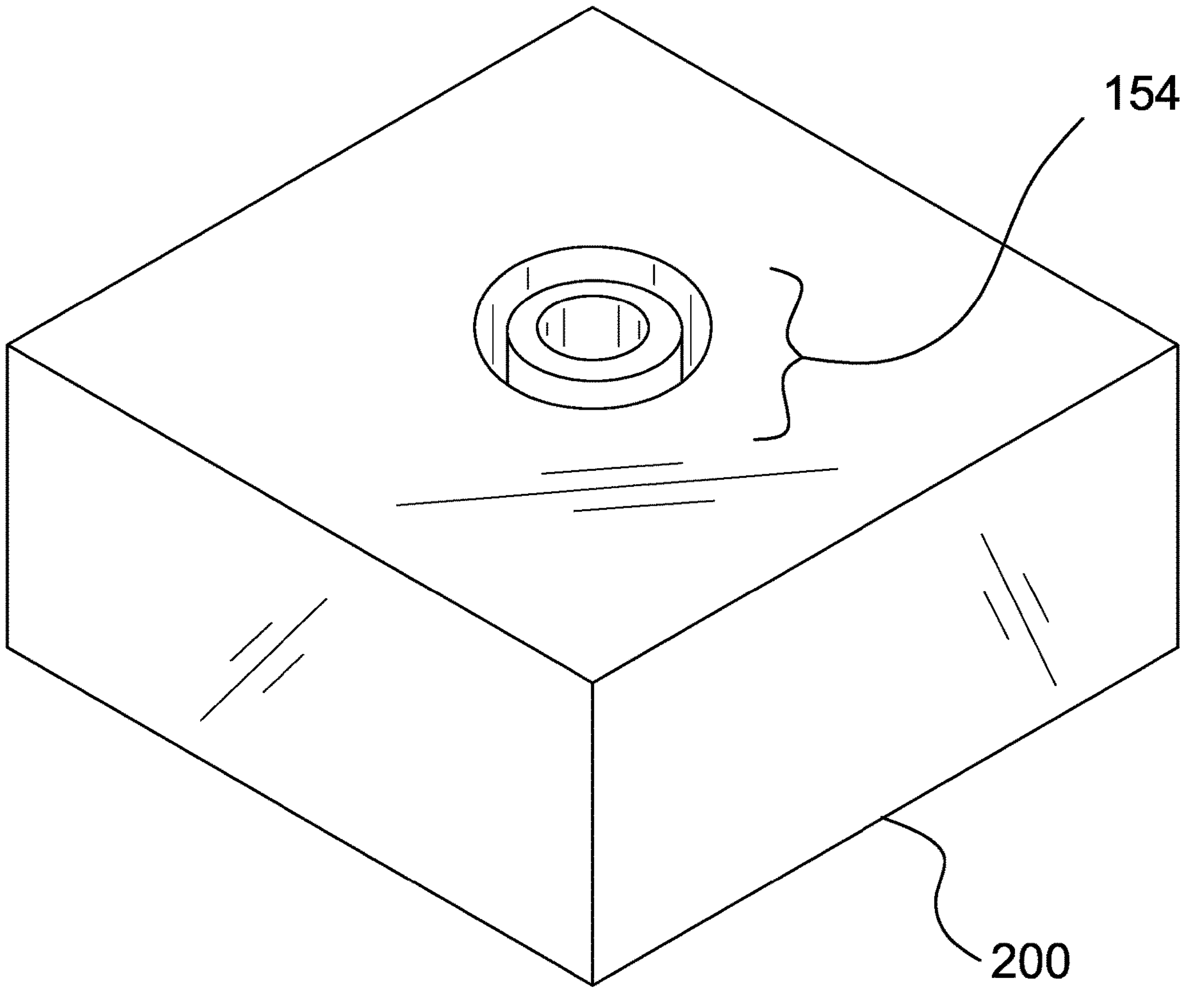
FIG. 9*b* is a detail view of an embodiment of the disclosure, illustrating the token port on the top of a stackable token.
Figure 10:
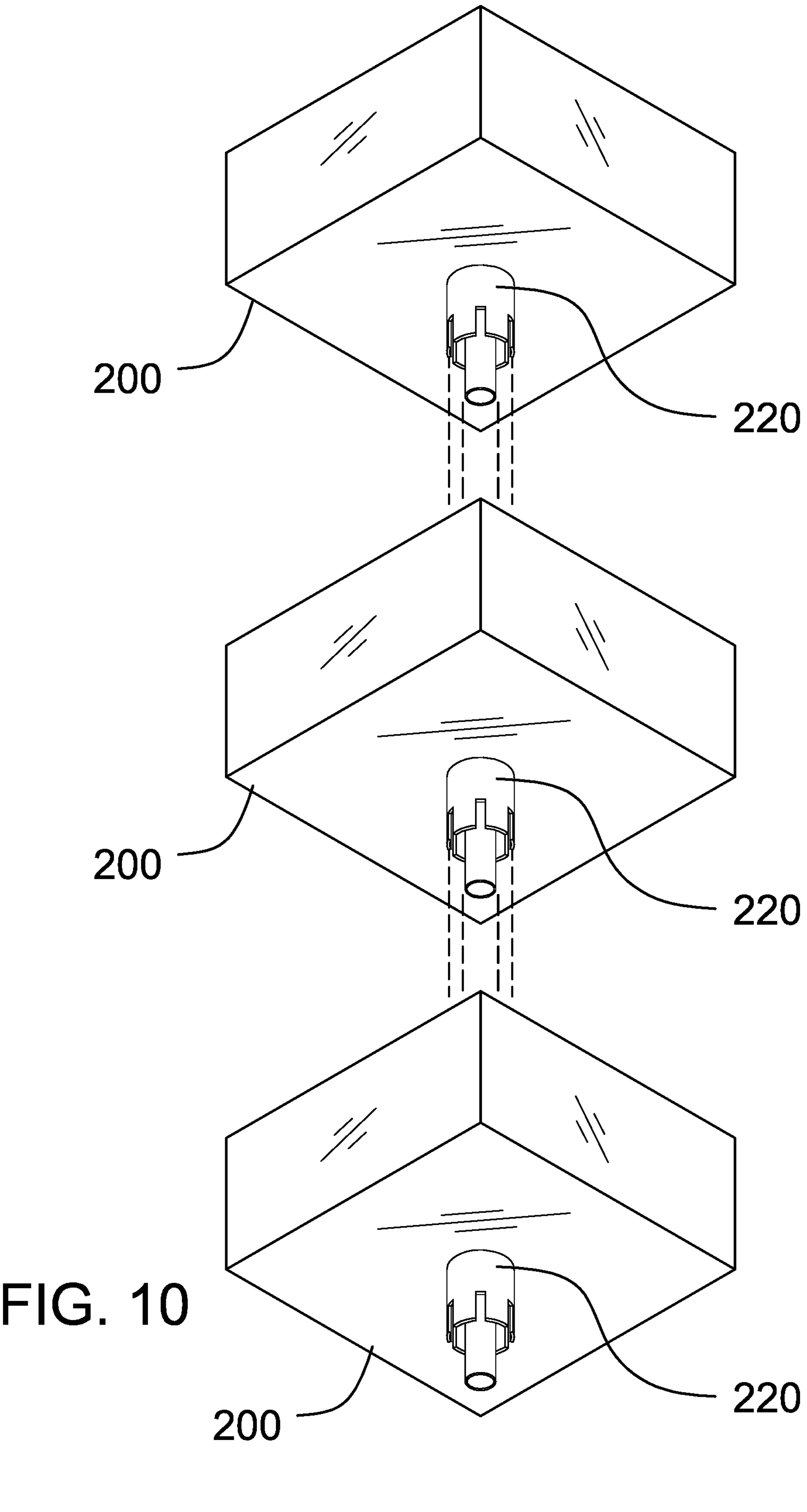
FIG. 10 is an exploded detail view of an embodiment of the disclosure, illustrating multiple stackable tokens.

Detailed reference will now be made to a first potential embodiment of the disclosure, which is illustrated in FIGS. 1 through 10.

The illuminated game board 100 (hereinafter invention) comprises is configured for use with a board game. The invention 100 forms the playing surface for the board game. The invention 100 provides illumination for the play of the game. The invention 100 provides a contained space that are used to contain one or more dice 134 within the playing surface formed by the invention 100. The invention 100 comprises a game board 101 and a lamp circuit 102. The lamp circuit 102 mounts in the game board 101. The game board 101 forms the playing surface and the containment space for the board game. The lamp circuit 102 illuminates the game board 101. A plurality of illuminated tokens 122, which may be stackable tokens 200, may be positioned on the game board 101 to mark the position of a competitor.

The game board 101 forms the playing surface of the board game associated with the invention 100. The game board 101 is a prism shaped structure. The game board 101 has a pan shape. The game board 101 forms a pan structure 111.

The pan structure 111 is a mechanical structure. The pan structure 111 is a prism shaped structure. The pan structure 111 has a pan shape. The pan structure 111 forms the contained space used to play the board game. The pan structure 111 further comprises an open face 131, a closed face 132, a plurality of lateral faces 133, and the one or more dice 134.

The open face 131 is the open face 131 of the pan structure 111. The open face 131 provides the access to the containment structure formed by the pan structure 111. The closed face 132 is the closed face 132 of the pan structure 111. The closed face 132 forms a horizontally oriented playing surface. The closed face 132 is the surface of the pan structure 111 that rests on a supporting surface. The closed face 132 is the surface of the pan structure 111 that is distal from the open face 131. The closed face 132 further comprises a gb image 151. The plurality of lateral faces 133 are the lateral faces of the pan structure 111. The plurality of lateral faces 133 forms the vertically oriented containment surfaces that form the containment structure of the pan structure 111.

The gb image 151 is an image formed on the interior face of the closed face 132 of the pan structure 111. The gb image 151 presented on the closed face 132 is specific to the board game associated with the invention 100. The gb image 151 presents indicia used to indicate sentiments that are relevant to the competitors during the play of the board game. The gb image 151 presents a plurality of gb regions 152. Each of the plurality of gb regions 152 is a specific location within the gb image 151 that is specifically identified as a sentiment by the indicia of the plurality of gb regions 152. The region of a board game is defined elsewhere in this disclosure. The sentiment associated with each of the plurality of gb regions 152 is relevant to the play of the board game. The plurality of gb regions 152 comprises a collection of individual gb regions 153. The individual gb region 153 is a specific gb region selected from the plurality of gb regions 152. Each of the individual gb regions 153 further comprises a token port 154. In some embodiments, some of the individual gb regions 153 may comprise more than one of the token ports 154.

The token port 154 is an electrical port. Each of the individual gb regions 153 selected from the plurality of gb regions 152 comprises at least one of the token ports 154. The token port 154 forms an electric connection with a battery 141 of a power circuit 123 with the lamp circuit 102. The token port 154 transmits the electric energy drawn from the battery 141 to the illuminated token plugged into the token port 154 such that the transmitted electric energy illuminates the illuminated token.

Each of the one or more dice 134 is a randomizing device. Each of the one or more dice 134 is a die. Each of the one or more dice 134 are thrown into the containment structure formed by the pan structure 111. The one or more dice 134 are used to generate random events that are used by competitors during the play of the board game.

The plurality of illuminated tokens 122 may be the stackable tokens 200. Each of individual tokens selected from the plurality of illuminated tokens 122 may comprise a token plug 220 on the bottom of the individual token. The token plug 220 may be hollow and may plug into the hollow token port 154 on the game board 101 or into the token port 154 on one of the stackable tokens 200. The stackable tokens 200 may comprise the token port 154 on the top of the stackable tokens 200. The stackable tokens 200 may therefore plug into the game board 101 or into the top of one of the stackable tokens 200. The token plug 220 on the bottom of the stackable tokens 200 may be electrically coupled to the token port 154 on the top of the stackable tokens 200 such that the stackable tokens 200 may convey electrical energy to any illuminated token that is plugged above the stackable tokens 200.

All tokens may comprise one of multiple shapes. As non-limiting examples, the tokens may be cone shaped, triangle shaped, square shaped, or round shaped. As a non-limiting example, the plurality of illuminated tokens 122 may comprise one or more light-emitting diodes such that the plurality of illuminated tokens 122 illuminate when plugged into the token port 154.

The lamp circuit 102 is an electric circuit. The lamp circuit 102 provides the plurality of illuminated tokens 122 for use on the game board 101. Each illuminated token selected from the plurality of illuminated tokens 122 marks the position of a competitor on the individual gb region 153 the competitor is on. The lamp circuit 102 provides electric energy to each of the individual gb regions 153 selected from the plurality of gb regions 152 of the game board 101. Each illuminated token selected from the plurality of illuminated tokens 122 may plug into the source of electrical energy provided at the individual gb region 153 selected from the plurality of gb regions 152 that the competitor lands on. The lamp circuit 102 provides the electric energy that illuminates the selected illuminated token while the token is on the individual gb region 153.

The lamp circuit 102 is an independently powered electric circuit. By independently powered is meant that the lamp circuit 102 can operate without an electrical connection to an external power source 144. The lamp circuit 102 comprises a master switch 121, the plurality of illuminated tokens 122, and the power circuit 123. The master switch 121, the plurality of illuminated tokens 122, and the power circuit 123 are electrically interconnected. The master switch 121 is an electric switch. The master switch 121 is a maintained switch. The master switch 121 electrically connects the plurality of illuminated tokens 122 to the power circuit 123. The master switch 121 controls the flow of electric energy from the power circuit 123 to the plurality of illuminated tokens 122. The master switch 121 is effectively the power switch of the invention 100. Specifically, the master switch 121 forms an electric connection between the power circuit 123 and the token port 154 mounted in each the individual gb region 153 selected from the plurality of gb regions 152 of the gb image 151.

The token port 154 transfers electrical energy from the power circuit 123 to any illuminated token that is plugged into the token port 154. Each illuminated token selected from the plurality of illuminated tokens 122 is a token that marks the position of a competitor on the individual gb region 153 selected from the plurality of gb regions 152 of the gb image 151. Each illuminated token selected from the plurality of illuminated tokens 122 is plugged into the token port 154 of the individual gb region 153 marking the position of the competitor or is plugged into one of the stackable tokens 200. The token port 154 transfers from the lamp circuit 102 the electric energy required to illuminate the selected illuminated token that was plugged into the token port 154.

The power circuit 123 is an electrical circuit. The power circuit 123 powers the operation of the lamp circuit 102. The power circuit 123 converts chemical potential energy into the electrical energy required to power the lamp circuit 102. The power circuit 123 comprises the battery 141, a diode 142, a charging port 143, and the external power source 144. The battery 141 is an electrochemical device. The battery 141 converts chemical potential energy into the electrical energy used to power the lamp circuit 102. The battery 141 is a commercially available rechargeable the battery 141. The chemical energy stored within the battery 141 is renewed and restored through use of the charging port 143. The charging port 143 is an electrical circuit that reverses the polarity of the battery 141 and provides the energy necessary to reverse the chemical processes that the battery 141 initially used to generate the electrical energy. This reversal of the chemical process creates a chemical potential energy that will later be used by the battery 141 to generate electricity. The battery 141 may comprise a first positive terminal 161 and a first negative terminal 171.

The external power source 144 may comprise a second positive terminal 162 and a second negative terminal 172. The external power source 144 further comprises a charging plug 145. The battery 141, the diode 142, the charging port 143, the external power source 144, and the charging plug 145 are electrically interconnected.

The charging port 143 forms an electrical connection to the external power source 144 using the charging plug 145. The charging plug 145 forms a detachable electrical connection with the charging port 143. The charging port 143 receives electrical energy from the external power source 144 through the charging plug 145. The diode 142 is an electrical device that allows current to flow in only one direction. The diode 142 installs between the battery 141 and the charging port 143 such that electricity will not flow from the first positive terminal 161 of the battery 141 into the second positive terminal 162 of the external power source 144.

As non-limiting examples, the game board 101 and the plurality of illuminated tokens 122 may be made of low cost, unbreakable plastic. The game board 101 and the plurality of illuminated tokens 122 are not intended to be limited in terms of colors, shapes, sizes, logos or other imagery, number of LEDs used for illumination, or any combination thereof.

In some embodiments, the obverse and reverse sides of the game board 101 may comprise different gb images and/or different positioning of the token ports 154 such that different games May be played on the obverse and reverse sides of the game board 101.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used in this disclosure, a "die" may be a cube that is formed with a series of spots, or pips, of the faces of the cube such that a first face has one pip, a second face has two pips, a third face has 3 pips, a fourth face has four pips, a fifth face has five pips, and a six face has six pips. The die is "thrown" to select a number randomly between one and six (inclusive). The plural of die is dice.

As used in this disclosure, a "diode" may be a two terminal semiconductor device that allows current flow in only one direction. The two terminals are called the anode and the cathode. Electric current is allowed to pass from the anode to the cathode.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, an "external power source" may be a source of the energy that is externally provided to enable the operation or recharging of a device. Examples of external power sources include, but are not limited to, electrical power sources and compressed air sources.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, an "image" may be an optical representation or reproduction of an indicia or of the appearance of something or someone.

As used in this disclosure, the term "indicia" may refer to a set of markings that identify a sentiment.

As used in this disclosure, the word "interior" may be used as a relational term that implies that an object is located or contained within the boundary of a structure or a space.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "maintained switch" may be a switch that maintains the position that was set in the most recent switch actuation. A maintained switch works in an opposite manner to a momentary switch.

As used in this disclosure, a "plug" may be an electrical termination that electrically connects a first electrical circuit to a second electrical circuit or a source of electricity.

As used in this disclosure, a "port" may be an electrical termination that is used to connect a first electrical circuit to a second external electrical circuit.

As used herein, "random" may refer to an outcome which cannot be predicted in advance or to a sequence that lacks a definite pattern. Unless stated otherwise, random includes both truly random and pseudorandom outcomes and sequences. Pseudorandom may refer to an outcome or sequence that is selected by a definite computational process but that satisfies one or more standard tests for statistical randomness.

As used in this disclosure, a "sentiment" may refer to a symbolic meaning or message that is communicated through the use of an image, potentially including a text based image.

As used in this disclosure, a "supporting surface" may be a horizontal surface upon which an object is placed. Within this disclosure, it is assumed that the object is placed on the supporting surface in an orientation that is appropriate for the normal or anticipated use of the object.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An illuminated game comprising:

an illuminated game board comprising a game board and a lamp circuit, wherein the game board forms a playing surface and the lamp circuit mounts in the game board;

a plurality of tokens, wherein the plurality of tokens are configured to be positioned on the game board to mark a position of a competitor;

one or more dice, wherein the game board forms a containment space to use the one or more dice;

wherein the playing surface comprises a gb image comprising a plurality of gb regions, each gb region comprising one or more token ports, wherein each token port is an electrical port forming an electric connection with a battery of a power circuit with the lamp circuit;

wherein each token port is configured to transmit electric energy from the battery to a token of the plurality of tokens that is plugged into the token port such that the transmitted energy illuminates the token plugged into the token port;

where each token of the plurality of tokens comprises a hollow token plug on a bottom, and a port on a top; wherein the token plug is configured to be plugged into each of the one or more token ports; and wherein the plurality of tokens are stackable such that a first token of the plurality of tokens that is plugged into a token port is configured to be electrically connected and illuminated by the token port, and a second token of the plurality of tokens can be stacked on the first token by inserting its plug into a port of the second token, wherein the second token will be electrically connected and illuminated by electrically energy being conveyed from the first token to the second token.

2. The illuminated game board according to claim 1, wherein the game board forms a pan structure.

3. The illuminated game according to claim 2, wherein the pan structure further comprises an open face, a closed face, a plurality of lateral faces.

4. The illuminated game according to claim 3, wherein the open face of the pan structure provides access to the containment space; wherein the closed face is a surface of the pan structure that rests on a supporting surface; wherein the closed face further comprises the gb image; and wherein the plurality of lateral faces forms vertically oriented containment surfaces that form the containment space.

5. The illuminated game according to claim 4, wherein each of the one or more dice are thrown into the containment space; wherein the one or more dice are used to generate random events that are used by competitors during play of the game.

6. The illuminated game according to claim 5, wherein the plurality of tokens each comprise one or more light-emitting diodes that illuminate when its plug is plugged into a token port of the one or more token ports.

7. The illuminated game according to claim 6, wherein the lamp circuit is an electric circuit; wherein the lamp circuit provides electric energy to the plurality of tokens for use on the game board; wherein each token from the plurality of tokens marks a position of a competitor on a gb region of the plurality of gb regions.

8. The illuminated game according to claim 7, wherein the lamp circuit is an independently powered electric circuit; wherein the lamp circuit can operate without an electrical connection to an external power source; wherein the lamp circuit comprises a master switch, a token of the plurality of tokens, and the power circuit; wherein the master switch, the token of the plurality of tokens, and the power circuit are electrically interconnected; wherein the master switch is an electric switch that electrically connects the plurality of tokens to the power circuit; wherein the master switch controls a flow of electric energy from the power circuit to the plurality of tokens; wherein the master switch forms an electric connection between the power circuit and the one or more token ports.

9. The illuminated game according to claim 8, wherein the one or more token ports transfer electrical energy from the power circuit to any token that is plugged into the one or more token ports; wherein the token port transfers the electric energy from the lamp circuit that is required to illuminate the token that was plugged into the one or more token ports.

10. The illuminated game according to claim 9, wherein the power circuit powers the lamp circuit; wherein the power circuit converts chemical potential energy into the electrical energy required to power the lamp circuit; wherein the power circuit comprises the battery, a diode, a charging port, and the external power source; wherein the battery is an electrochemical device; wherein the battery converts chemical potential energy into electrical energy used to power the lamp circuit; wherein the battery is a rechargeable the battery; wherein the chemical energy stored within the battery is renewed and restored through use of the charging port; wherein the charging port is an electrical circuit that reverses a polarity of the battery and provides energy to reverse the chemical processes that the battery initially used to generate the electrical energy; wherein this reversal of the chemical process creates a chemical potential energy that can later be used by the battery to generate electricity.

11. The illuminated game according to claim 10, wherein the external power source further comprises a charging plug; wherein the battery, the diode, the charging port, the external power source, and the charging plug are electrically interconnected.

12. The illuminated game board according to claim 11, wherein the charging port forms an electrical connection to the external power source using the charging plug; wherein the charging plug forms a detachable electrical connection with the charging port; wherein the charging port receives electrical energy from the external power source through the charging plug; wherein the diode is an electrical device that allows current to flow in only one direction; wherein the diode installs between the battery and the charging port such that electricity will not flow from a first positive terminal of the battery into a second positive terminal of the external power source.

13. The illuminated game according to claim 12, wherein the game board comprises an obverse and reverse side comprising different gb images and/or different positioning of the one or more token ports such that different games are played on the obverse and reverse sides of the game board.

* * * * *